May 7, 1940.　　　J. L. S. KIRBY　　　2,200,027
AUTOMOBILE PARKING DEVICE
Filed Sept. 2, 1938　　　3 Sheets-Sheet 1

INVENTOR.
JOSEPH L. S. KIRBY.
BY *Victor J Evans & Co*
ATTORNEYS.

May 7, 1940.                J. L. S. KIRBY                2,200,027
                        AUTOMOBILE PARKING DEVICE
                          Filed Sept. 2, 1938        3 Sheets-Sheet 3

INVENTOR.
JOSEPH L. S. KIRBY.
BY *Victor J. Evans & Co*
ATTORNEYS.

Patented May 7, 1940

2,200,027

UNITED STATES PATENT OFFICE 2,200,027

AUTOMOBILE PARKING DEVICE

Joseph L. S. Kirby, San Francisco, Calif.

Application September 2, 1938, Serial No. 228,205

3 Claims. (Cl. 180—1)

This invention relates to improvements in automobile parking devices and has particular reference to a device for attachment to a motor vehicle, whereby the vehicle may be readily parked in a space slightly greater than the length of the vehicle, thus permitting a much closer parking of cars than is now possible, as it is necessary for the driver to maneuver back and forth in order to enter the parking space.

A further object is to produce a device of this character which may be attached to the ordinary motor vehicle without materially altering its construction.

A further object is to produce a device of this character which is simple to operate.

Other objects and advantages will be apparent during the course of the following description.

In the accompanying drawings forming a part of this specification and in which like numerals are employed to designate like parts throughout the same, Fig. 1 is a side elevation of my device as the same would appear when attached to a motor vehicle, a portion of the vehicle being shown in broken lines;

Figure 1:
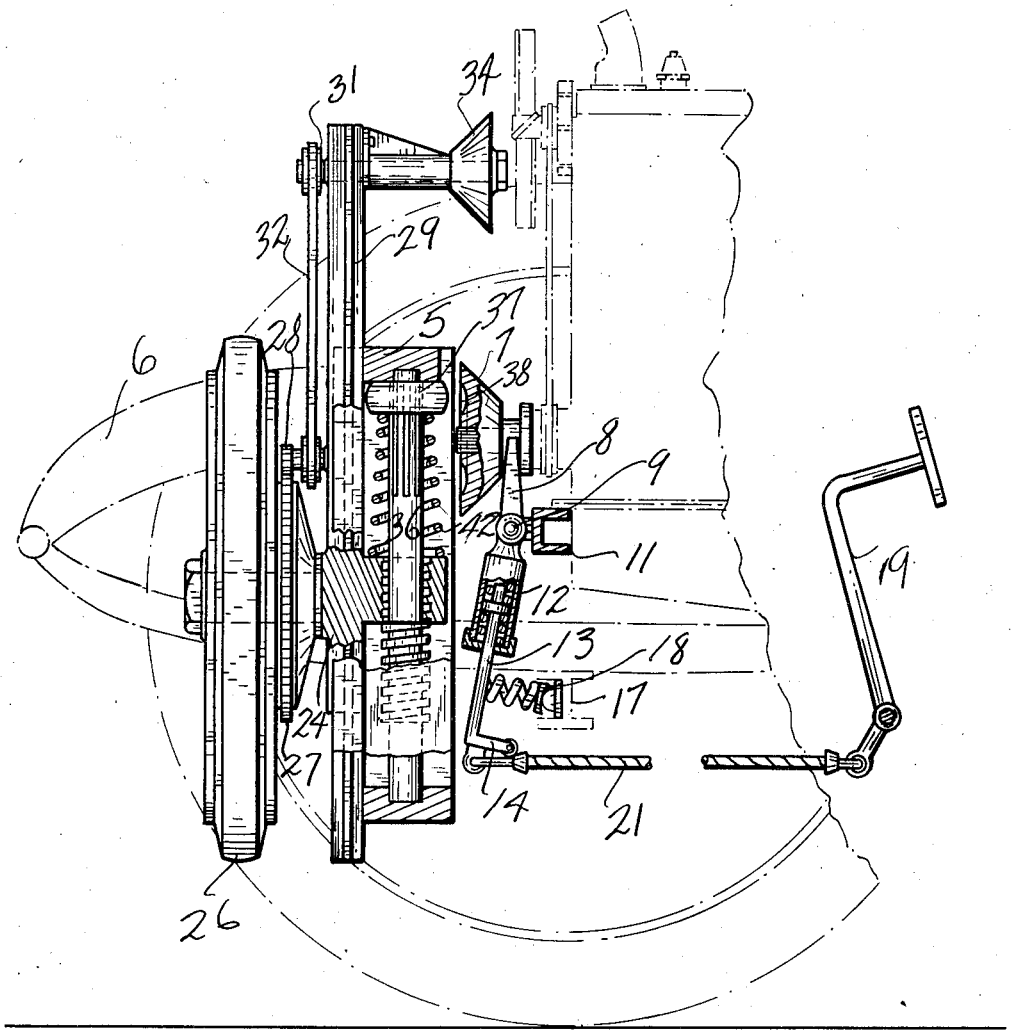

In order that a vehicle may be parked adjacent to a curb, it is often necessary to maneuver the vehicle back and forth in order to place the same parallel and close to the curb. When a car in front and behind are too close together, it is often impossible to park within the area, which is of sufficient length to admit the car, because of the necessity to move the car back and forth.

I have, therefore, devised a means whereby the rear end of the car may be backed into the parking space, and then the front end moved directly in through a side movement of the entire front end of the vehicle.

In the accompanying drawings wherein for the purpose of illustration is shown a preferred embodiment of my invention, the numeral 5 designates a framework which is attached to the chassis 6 of the vehicle, the chassis being shown in dotted lines. This framework supports the mechanism of my device directly in front of the engine so that a friction drive wheel 7 may be slidably connected to the front end of the motor shaft. This friction drive wheel is slidable upon its shaft through the medium of a yoke 8, pivoted as at 9 to the cross bar 11. Connected to the yoke 8 is a spring shock absorber 12 having a reciprocating rod 13 which terminates in an L-shaped arm 14, upon the end of which is mounted a roller 16 capable of underlying the front axle 17 when in the position of Fig. 2. A spring 18 normally keeps this L-shaped arm in the position of Fig. 1, and is only moved to the position of Fig. 2 through the movement of a foot pedal 19 and a cable 21 connecting the bottom of the rod 13 and the bottom of the foot pedal lever.

Mounted on the framework 5 is a guideway 22 formed in the casting 23. This guideway serves to movably position a sliding carriage 24, upon which is rotatably mounted a ground engaging wheel 26 having a ring gear 27 which is engaged by a gear 28 mounted in the slider 29 extending upwardly from the carriage 24. Adjacent the top of the slider 29 is a pulley 31, over which pulley a belt 32 is reeved, which belt is in turn reeved over a pulley 33 capable of driving the gear 28. The pulley 31 is driven by a friction disc 34 in a manner to be later described. Vertically positioned in the framework 5 is a shaft 36 which carries a friction disc 37 capable of engaging a recess 38 formed in the vertical face of the friction drive wheel 7. This friction disc 37 is splined to the shaft 36 so as to move from the position of Fig. 1 to that of Fig. 2, as will be later described. The shaft 36 has a thread 39 formed thereon, and said thread 39 is capable of engaging the thread 41 formed in the carriage 24. A spring 42 surrounds the shaft 36 and rides upon the upper surface of the carriage.

Figure 2:
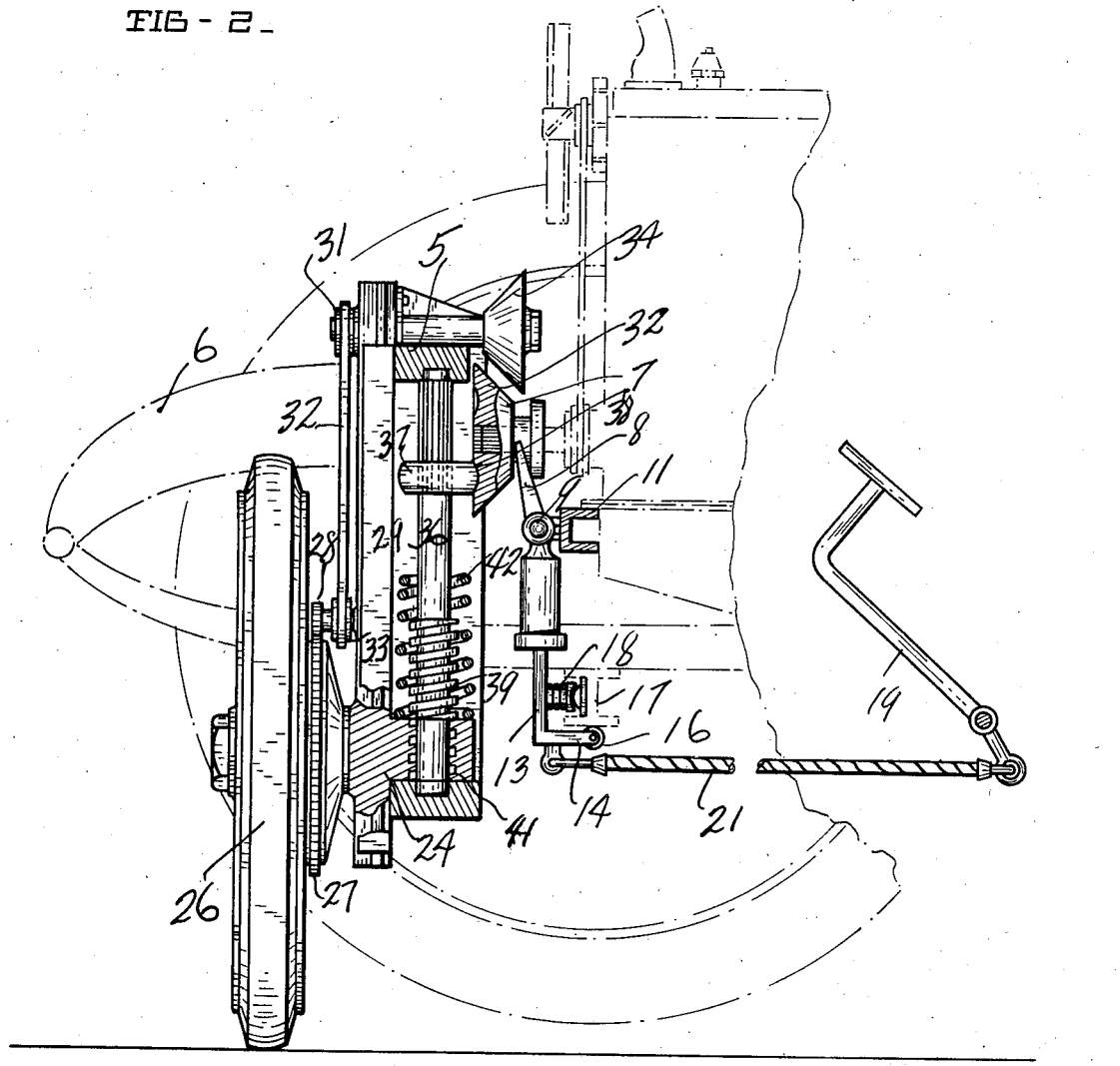
Fig. 2 is a view similar to Fig. 1, showing the device in lowered position and the vehicle in raised position, the vehicle again being shown in broken lines.
Figure 3:
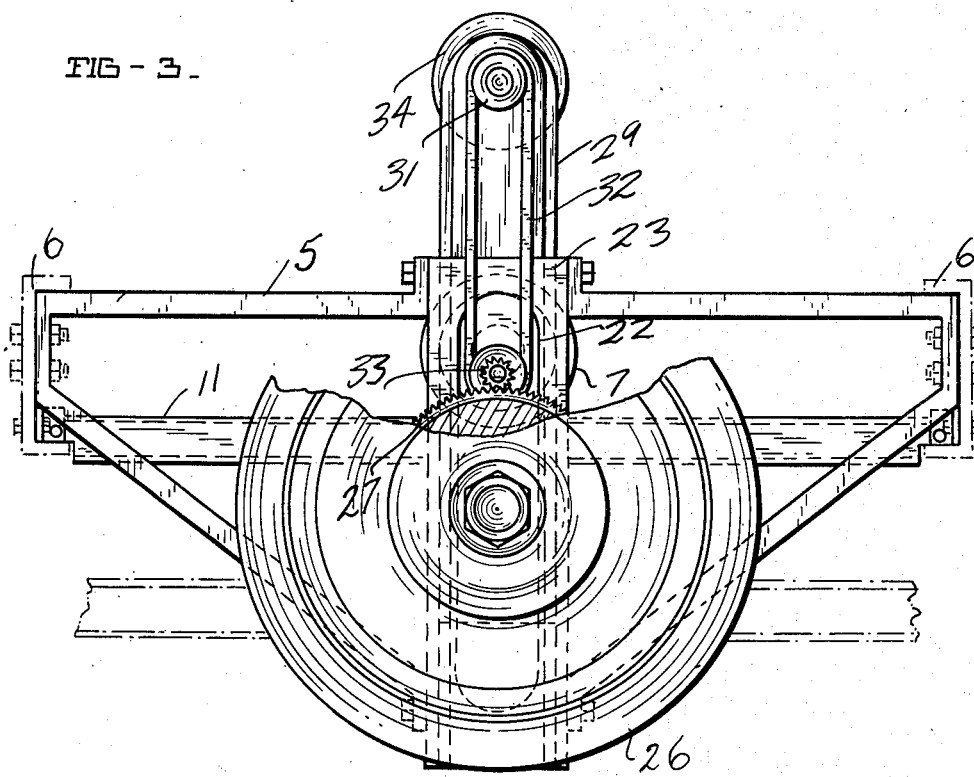
Fig. 3 is a front elevation of Fig. 1.
Figure 4:
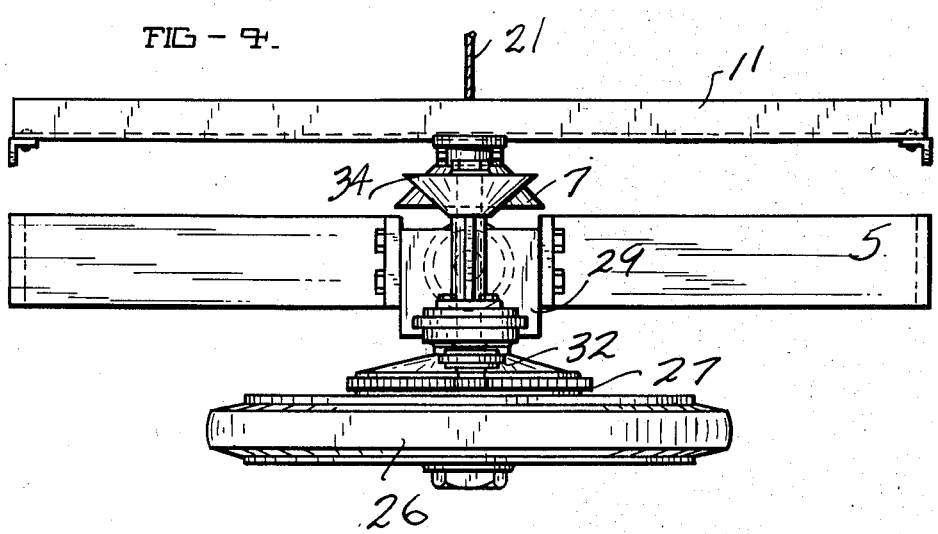
Fig. 4 is a top plan view of Fig. 3.

The operation of my device is as follows:

Assuming that the parts are in the position of Fig. 1 and the driver backs the rear of the car into the parking space and then desires to move the front toward the curb, he presses the foot pedal 19, which moves the shock absorber 12 from the position of Fig. 1 to that of Fig. 2. This causes the L-shaped arm 14 to move beneath the axle 17 against the tension of the spring 18. At the same time, the yoke 8 pushes the friction drive wheel 7 forwardly so that the friction drive wheel 37 engages the upper portion of the recess 38, causing the shaft 36 to rotate in a direction which will move the carriage 24 and its attached slider 29 downwardly. This movement will continue downwardly until the ground engaging wheel 26 contacts the ground and until the thread 41 of the carriage leaves the thread 39 formed upon the shaft 36. At the same time, it will be noted that the L-shaped arm 14 will have formed a lift for the axle so that the wheels of the vehicle will not drop due to the spring suspension thereof. The operator now releases his foot slightly, which moves the friction drive wheel 7 backwardly against the friction disc 34 to cause rotation thereof, which will deliver power through the belt 32 to the gear 28 and to the wheel 26. As the ground engaging wheel and the carriage are now in the lowermost position, the spring 42 will no longer be supporting the friction disc 37; and, consequently, it will drop from the position of Fig. 1 to that of Fig. 2 and will be in a position ready to rotate the shaft 36 in a reverse direction, when desired.

It will be apparent that the rotation of the ground engaging wheel 26 will move the car in the direction in which the wheel is rotated; and as the crown of the road is usually toward the curb, I prefer to drive the wheel 26 in such a direction that it will normally move the front of the car away from the curb and allow the front of the car to coast toward the curb through the effect of the road crowning. It is, of course, obvious that when the front of the vehicle is elevated, it will be a simple matter for the operator to manually push the front of the vehicle in either direction if necessary.

When it is desired to return the parts from the position of Fig. 2 to that of Fig. 1, the operator again moves the pedal so as to push the friction drive wheel 7 toward the friction disc 37, which is now in its lowered position. As a result, the shaft 36 will cause the carriage 24 to move upwardly thereon and to compress the spring 42 beneath the disc 37. As soon as the carriage has reached the top of the thread 41, it can move no further, and the operator now releases the foot pedal, and the spring will force the friction disc 37 to its elevated position. The spring 18 will move the friction drive wheel 7 away from the disc 37 and the L-shaped arm 14 from beneath the axle 17.

The reason for the spring shock absorber 12 is to relieve excessive strains caused by tipping of the vehicle or the moving of the wheel 26 over rough ground when the parts are in the position of Fig. 2.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a device of the character described, in combination with a motor vehicle having a driven shaft, of a friction drive wheel slidably mounted thereon, a frame secured to said vehicle and having a vertically sliding carriage positioned therein, said carriage supporting a rotatable ground engaging wheel, means for raising and lowering said carriage in said frame, said means including a vertically disposed rotatable shaft, connecting threads carried by said shaft and said casting, movable friction means interposed between said friction drive wheel and said vertically disposed rotatable shaft, whereby said shaft may be rotated in either direction, and a second friction means adapted to be engaged by said friction drive wheel when said ground engaging wheel is in its lowermost position to effect rotation of said ground engaging wheel.

2. The combination with a motor vehicle having a driven shaft and a friction disk slidably and rotatably mounted thereon, of a supporting framework carried by the chassis of the said vehicle adjacent the said driven shaft, a sliding carriage carried by the framework and vertically movable relative thereto, a traction element mounted to the sliding carriage, a vertical shaft rotatably carried by the supporting framework and threadedly receiving the sliding carriage, a friction disk carried by the said vertical shaft, clutch means to move the first-mentioned friction disk into engagement with the second-mentioned friction disk to lower the carriage and to move the said traction element into engagement with the ground and to elevate the chassis, and another friction disk carried by the slidable carriage adapted to engage the first-mentioned friction disk when the carriage is in the lowered position to rotate the said traction element.

3. The combination with a motor vehicle having a driven shaft and a friction disk slidably and rotatably mounted thereon, of a supporting framework carried by the frame of the said vehicle adjacent the said driven shaft, a sliding carriage carried by the supporting framework and vertically movable relative thereto, a traction element carried by the sliding carriage, a vertical shaft rotatably carried by the supporting framework and threadedly receiving the sliding carriage, a friction disk carried by the said vertical shaft, clutch means to move the first-mentioned friction disk into engagement with the second-mentioned friction disk to lower the carriage and to move the said traction element into engagement with the ground and to elevate the said chassis, another friction disk carried by the slidable carriage adapted to engage the first-mentioned friction disk when the carriage is in the lowered position to rotate the said traction element, and means co-operative with the said clutch means to engage the axle of the vehicle and to raise the same with the said chassis when the latter is elevated.

JOSEPH L. S. KIRBY.